C. W. CRAWFORD.
VEHICLE SPRING.
APPLICATION FILED MAY 22, 1913.

1,092,789.

Patented Apr. 7, 1914.

Witnesses.
Frank Waterfield.
S. C. Bale.

Inventor
Cary. W. Crawford.
by Bingham
Attorney.

UNITED STATES PATENT OFFICE.

CARY W. CRAWFORD, OF LOS ANGELES, CALIFORNIA.

VEHICLE-SPRING.

1,092,789.  Specification of Letters Patent.  Patented Apr. 7, 1914.

Application filed May 22, 1913.  Serial No. 769,195.

*To all whom it may concern:*

Be it known that I, CARY W. CRAWFORD, a citizen of the United States, residing at the city of Los Angeles, in the county of Los Angeles and State of California, have invented new and useful Improvements in Vehicle-Springs, of which the following is a specification.

Figure 1:
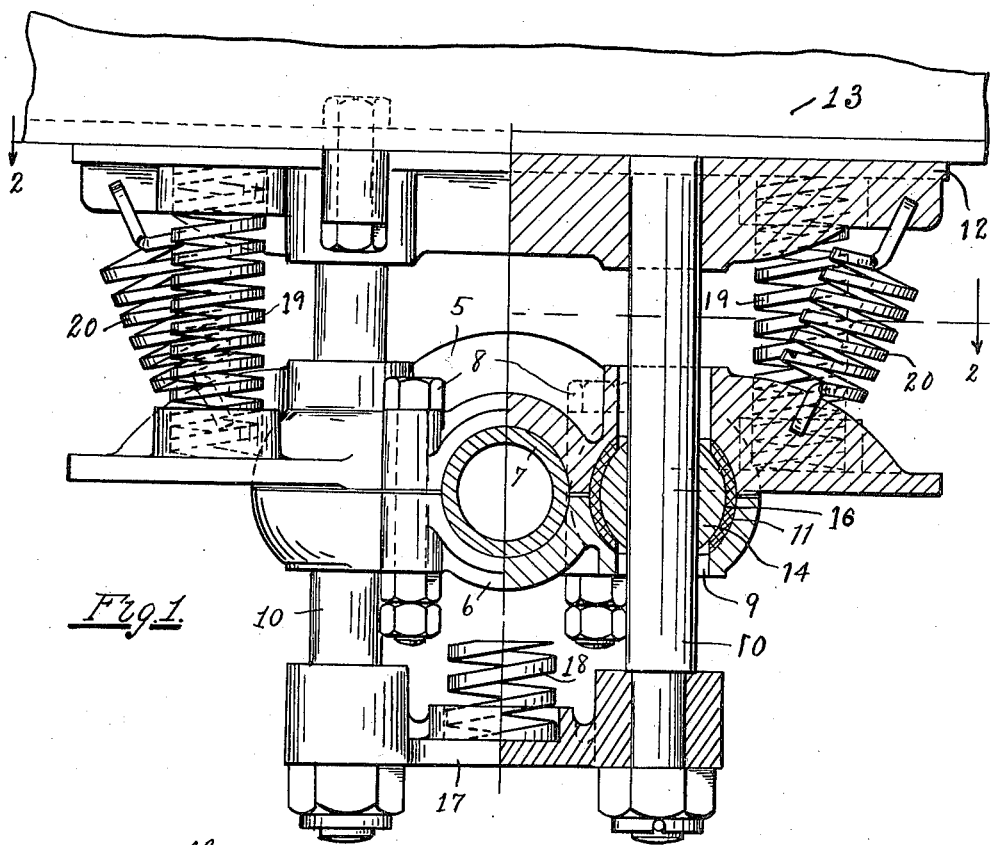
Figure 2:
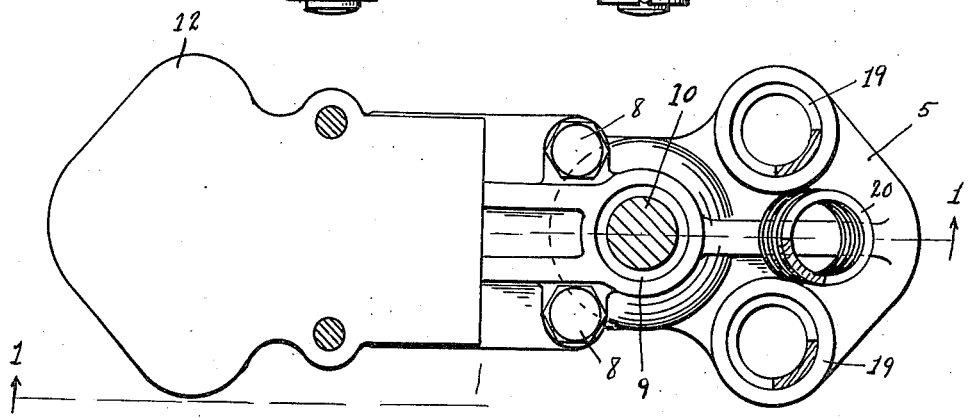

My invention relates primarily to springs for such vehicles as automobiles, wagons, carriages and the like and the object thereof is to provide springs for resisting the jar and other springs working against the resistance or shock springs to prevent an objectionable recoil when the vehicle passes over an obstruction or into a rut. I accomplish this object by the mechanism described herein and illustrated in the accompanying drawings forming a part hereof in which:

Figure 1 is a side view partly in vertical section with so much of a vehicle as is necessary to illustrate my invention. Fig. 2 is a section on the line 2—2 of Fig. 1.

In the drawings the axle frame is composed of an upper section 5 and a lower section 6 which are secured upon the axle 7 of the vehicle by bolts 8. At each side of the axle the frame is provided with vertical apertures 9 through which pass guide rods 10. The upper ends of these guide rods are forced into or otherwise secured in crown frame 12 which is bolted to the body 13 of the vehicle. Apertures 9 at the ends thereof are a little larger than the guide rods 10 so that the rods can move angularly to the frame within reasonable limits. The central portions of apertures 9 are enlarged and form recesses or sockets 11 whose inner surfaces are in shape preferably segments of a globe. Within these sockets are balls 14 preferably of bronze which are pierced centrally for the passage therethrough of guide rods 10. Sockets 11 may be machined or if not machined may have a Babbitt metal lining 16 to make a perfect fit between the balls and the axle frame. This lining is suitably anchored in the frame so as to turn with and not in it. On the lower ends of rods 10 is secured a tie bar 17. A buffer spring 18 is mounted on bar 17 below the axle to engage the axle frame if it should pass that far below its normal position. Between the axle frame and the crown frame and adjacent to rods 11 are mounted compression shock springs 19 which are under compression when positioned for use. There are preferably two of these springs on the outer side of each of the guide rods. Connected to the axle frame intermediate the shock springs are the tension rebound springs 20 which are connected to the crown frame at a point between the shock springs and outside thereof. These springs are tensioned when positioned and prevent the rebound of the shock springs from throwing the body of the vehicle too far above its normal position when passing over an obstruction.

While I have shown the shock springs as straight springs it will be understood that they may be single volute helix springs or double helico-volute springs if desired. The ends of the shock springs may be held positioned by cups as shown or by bosses if desired. By this construction the body of the vehicle is carried practically level while the wheels may conform to the unevenness of the ground.

Having described my invention what I claim is:

In a vehicle a crown frame secured to the body of the vehicle; an axle frame having a plurality of vertical openings extending therethrough and having said openings enlarged at the central portions to form segmental spherical chambers at the sides of the axle when positioned for use; segmental pierced balls in said chambers; guide rods secured to the crown frame and passing through the axle frame and balls therein; a tie bar connecting the lower ends of said guide rods; a buffer spring on said bar; shock springs between the crown and axle frames; and tension springs secured to the crown and axle frames.

In witness that I claim the foregoing I have hereunto subscribed my name this 12th day of May, 1913.

CARY W. CRAWFORD.

Witnesses:
G. E. HARPHAM.
FRANK WATERFIELD.

Copies of this patent may be obtained for five cents each, by addressing the "Commissioner of Patents, Washington, D. C."